US008919864B2

(12) United States Patent
Kojima et al.

(10) Patent No.: US 8,919,864 B2
(45) Date of Patent: Dec. 30, 2014

(54) ATTACHMENT STRUCTURE FOR ADJUSTABLE AIR DIFFUSER

(71) Applicant: Fuji Jukogyo Kabushiki Kaisha, Tokyo (JP)

(72) Inventors: Naoki Kojima, Tokyo (JP); Shinji Fukushima, Tokyo (JP); Takashi Suzuki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/026,395

(22) Filed: Sep. 13, 2013

(65) Prior Publication Data

US 2014/0084624 A1  Mar. 27, 2014

(30) Foreign Application Priority Data

Sep. 27, 2012  (JP) ................................. 2012-213911

(51) Int. Cl.
*B60K 11/08* (2006.01)

(52) U.S. Cl.
CPC .................................. *B60K 11/085* (2013.01)
USPC ................... 296/180.5; 296/187.09; 293/113; 180/68.1

(58) Field of Classification Search
CPC ....... B60K 11/04; B60K 11/08; B60K 11/085
USPC ........ 296/180.1, 180.2, 180.3, 180.5, 187.03, 296/187.09; 293/113; 180/68.1
See application file for complete search history.

(56) References Cited

U.S. PATENT DOCUMENTS

| 7,887,125 | B2 | 2/2011 | Tazaki et al. | |
| 8,128,153 | B2 * | 3/2012 | Bernt et al. | 296/187.04 |
| 8,181,727 | B2 | 5/2012 | Ritz et al. | |
| 8,292,014 | B2 | 10/2012 | Sugiyama | |
| 8,485,296 | B2 | 7/2013 | Charnesky et al. | |
| 8,517,130 | B2 | 8/2013 | Sakai | |
| 8,561,738 | B2 | 10/2013 | Charnesky et al. | |
| 8,646,552 | B2 | 2/2014 | Evans et al. | |
| 2010/0243352 | A1 | 9/2010 | Watanabe et al. | |
| 2012/0022742 | A1 * | 1/2012 | Nemoto | 701/36 |
| 2012/0090906 | A1 | 4/2012 | Charnesky et al. | |

(Continued)

FOREIGN PATENT DOCUMENTS

| EP | 1 762 437 B1 | 12/2010 |
| JP | 2007-1503 A | 1/2007 |

(Continued)

*Primary Examiner* — Glenn Dayoan
*Assistant Examiner* — Jason S Daniels
(74) *Attorney, Agent, or Firm* — Smith, Gambrell & Russell LLP

(57) ABSTRACT

An adjustable air diffuser is disposed in an airflow channel into which a travelling wind is directed through an opening provided in a bumper face. The diffuser opens and closes the channel by movable louver blades driven by an actuator. An upper part of the diffuser is disposed to face a rear wall of the bumper face and is attached to a bumper beam extending along a vehicle width direction. A lower part of the diffuser is attached to a vehicle body structural member. The attachment structure includes a column that is disposed behind the adjustable air diffuser. A lower end of the column is attached to a lower end of the adjustable air diffuser. Weak portions are provided on the column such that the column breaks when the column interferes with another member behind the column.

6 Claims, 3 Drawing Sheets

(56) References Cited

U.S. PATENT DOCUMENTS

| | | |
|---|---|---|
| 2012/0312611 A1 | 12/2012 | Van Buren et al. |
| 2013/0146375 A1 | 6/2013 | Lee |
| 2013/0268164 A1* | 10/2013 | Sugiyama ................. 701/49 |
| 2014/0090911 A1 | 4/2014 | Oota |

FOREIGN PATENT DOCUMENTS

| | | |
|---|---|---|
| JP | 2007-069825 | 3/2007 |
| JP | 2008-179342 | 8/2008 |
| JP | 2011-068292 | 4/2011 |

\* cited by examiner

ATTACHMENT STRUCTURE FOR ADJUSTABLE AIR DIFFUSER

CROSS-REFERENCES TO RELATED APPLICATIONS

The present application claims priority from Japanese Patent Application No. 2012-213911 filed on Sep. 27, 2012, the entire contents of which are hereby incorporated by reference.

BACKGROUND

1. Technical Field

The present invention relates to an attachment structure for an adjustable air diffuser that opens and closes an airflow channel in a vehicle by movable louver blades. More particularly, the present invention relates to an attachment structure for an adjustable air diffuser that prevents a column behind the adjustable air diffuser from causing any damage to the rear part of a vehicle body when a vehicle is in a collision.

2. Related Art

In a vehicle such as an automobile, travelling wind is directed into slatted openings provided in a bumper face that is an exterior component disposed on a front end of the vehicle in order to cool a radiator and a condenser for an air conditioning system.

Recently, in order to reduce the air resistance of a moving vehicle and suppress fuel consumption, an adjustable air diffuser (a variable flow duct) has been proposed. The adjustable air diffuser shuts a cooling wind flow by using movable louver blades when a cooling load is relatively low. An example of such an adjustable air diffuser is disclosed in Japanese Unexamined Patent Application Publication No. 2007-1503.

When a vehicle moves through a puddle while the louver blades of the adjustable air diffuser are closed, the apparatus is pushed back by water pressure. As a result, the adjustable air diffuser may be broken or dropped. Accordingly, it is proposed that a column for reinforcement is provided behind the adjustable air diffuser.

However, in the case where the adjustable air diffuser is displaced backward with respect to a vehicle body by a slight collision or the like, the column may interfere with a behind member of the vehicle body and causes damage to the member, thereby increasing labor and cost of repairing the damage.

SUMMARY OF THE INVENTION

Accordingly, it is an object of the present invention to provide an attachment structure for an adjustable air diffuser that is capable of preventing a column provided behind the adjustable air diffuser from causing damage to other members of a vehicle body in a collision.

A first aspect of the invention provides an attachment structure for an adjustable air diffuser that is disposed in an airflow channel into which a travelling wind is directed through an opening provided in a bumper face and that substantially opens and closes the airflow channel by a movable louver blade to be driven by an actuator. An upper part of the adjustable air diffuser is disposed to face a rear wall of the bumper face and is attached to a bumper beam extending substantially along a vehicle width direction. A lower part of the adjustable air diffuser is attached to a vehicle body structural member. The attachment structure includes a column that is disposed behind the adjustable air diffuser. A lower end of the column is attached to a lower end of the adjustable air diffuser. Weak portions are provided on the column such that the column breaks when the column interferes with another member behind the column.

In the attachment structure for the adjustable air diffuser according to the first aspect, each of the weak portions may be provided in the column at the vicinity of each of an intermediate position and a lower end position in a height direction of the column.

A second aspect of the invention provides an attachment structure for an adjustable air diffuser that is disposed in an airflow channel into which a travelling wind is directed through an opening provided in a bumper face and that substantially opens and closes the airflow channel by movable louver blades to be driven by an actuator. An upper part of the adjustable air diffuser is disposed to face a rear wall of the bumper face and is attached to a bumper beam extending substantially along a vehicle width direction. A lower part of the adjustable air diffuser is attached to a vehicle body structural member. The attachment structure includes a column that is disposed behind the adjustable air diffuser. A lower end of the column is attached to a lower end of the adjustable air diffuser. The column is capable of being dropped from the adjustable air diffuser by another member behind the column when the column interferes with the another member.

In the attachment structure for the adjustable air diffuser according to the first or second aspect, an upper end of the column may be attached to an upper end of the adjustable air diffuser such that the upper end of the adjustable air diffuser is detachable from the column when the upper end of the adjustable air diffuser receives a backward load over a predetermined value. The column is provided with a diagonal face that is pushed to move upward in response to relative retraction movement of the upper end of the adjustable air diffuser after the adjustable air diffuser has been detached from the column.

DETAILED DESCRIPTION

An object of the invention is to provide an attachment structure for an adjustable air diffuser that can prevent a column provided behind the adjustable air diffuser from causing damage to other parts of a vehicle body in a collision. The invention accomplishes the object by urging the adjustable air diffuser (a variable duct) and the column to move backward in a diagonal backward direction and by breaking a weak portion formed on the column which becomes a starting point of breakage when the column interferes with a vehicle body in a slight collision.

First Example

A first example of an attachment structure for an adjustable air diffuser of the invention will be described below.

An attachment structure for an adjustable air diffuser according to the first example is provided at, for instance, the front part of an automobile such as a passenger car.

Figure 1:
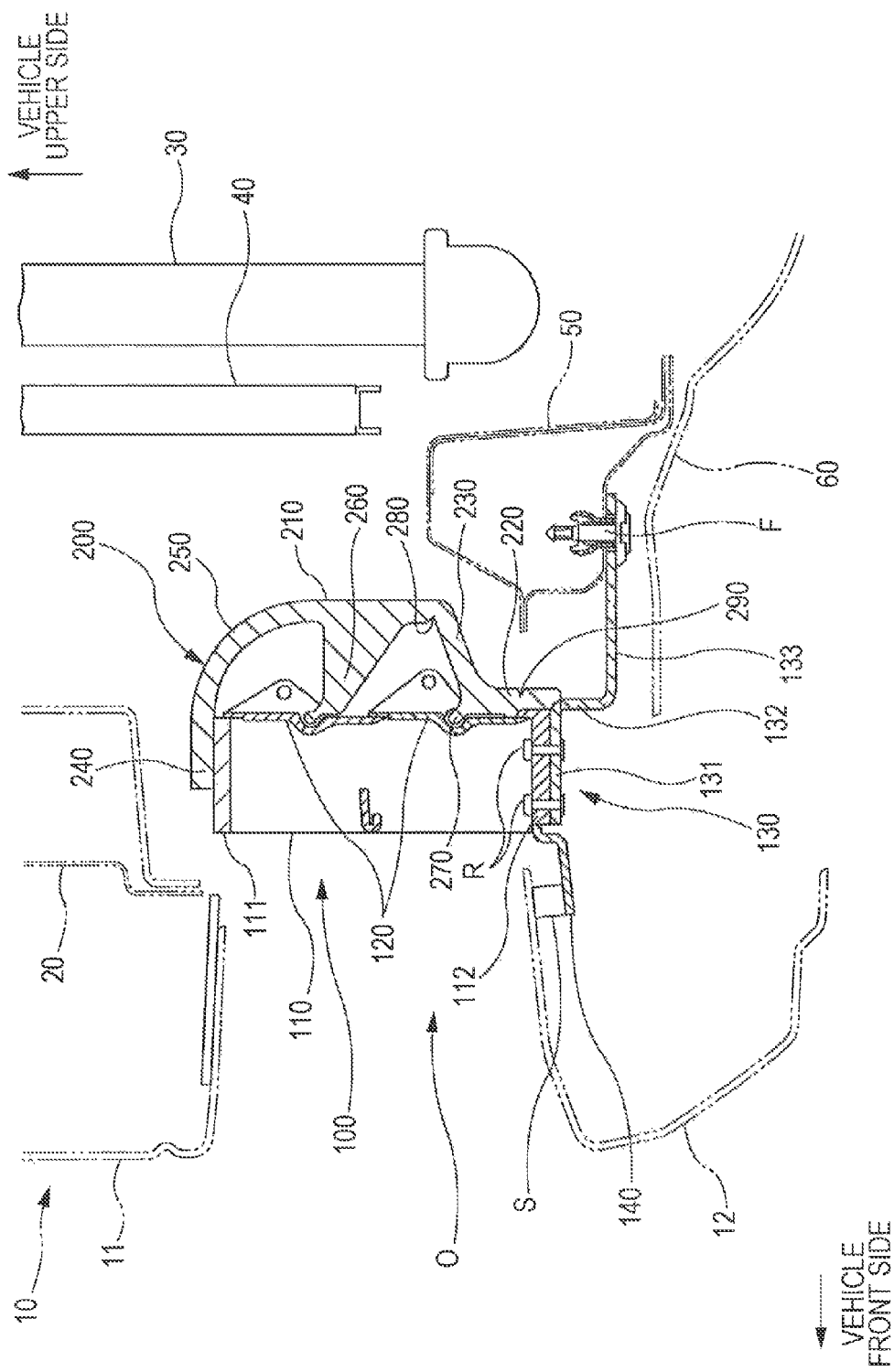
FIG. 1 is a sectional view of a front part of a vehicle including an attachment structure for an adjustable air diffuser according to a first example of the invention, the view being taken in the vehicle direction and illustrating the front part in a state prior to a collision.

FIG. 1 is a sectional view of a front part of a vehicle including an attachment structure for an adjustable air diffuser according to the first example of the invention, the view being taken in the vehicle direction and illustrating the front part in a state prior to a collision.

The vehicle includes, for instance, a bumper face 10, a bumper beam 20, a radiator core 30, a condenser 40, a radiator panel lower member 50, an under cover 60, a variable duct 100, and the like.

The bumper face 10 is made of a resin such as polypropylene (PP) and is an exterior component to be exposed outside a vehicle. The bumper face 10 includes an integrated main body 11, an air dam 12, and the like.

The main body 11 is disposed adjacent to a lower side of headlights or a front grille (not illustrated). The main body 11 extends substantially along the vehicle width direction. The central part of the main body 11 in the vehicle width direction is curved so as to project forward in a bulged shape. The cross-sectional shape of the main body 11 taken in the vehicle width direction is curved or bent so as to project forward in a bulged shape.

The air dam 12 is disposed below and is spaced apart from the main body 11. The air dam 12 extends substantially along the vehicle width direction. The central part of the air dam 12 in the vehicle width direction is curved so as to project forward in a bulged shape. The cross-sectional shape of the air dam 12 taken in the vehicle width direction is curved or bent so as to project forward in a bulged shape. An opening O is defined between the main body 11 and the air dam 12 so as to direct a wind that occurs when the motor vehicle is travelling (hereinafter referred to "a travelling wind") into the opening O.

The bumper beam 20 is disposed behind the main body 11 of the bumper face 10 and is a beam-like member that extends substantially along the vehicle width direction. The bumper beam 20 absorbs a load in a collision of the vehicle from a front side of the vehicle while the bumper beam 20 is being deformed, and transmits the load to a front side frame that is one of the components of a vehicle body (not illustrated).

The bumper beam 20 is formed into a beam-like shape having a closed cross section by coupling and welding pressed panels made of a steel sheet or by using a roll-formed sheet or an extruded sheet. The bumper beam 20 is curved so as to project forward in a bulged shape in correspondence with the produced shape of the bumper face 10. An energy absorption (EA) foam (not illustrated) may be provided between the bumper beam 20 and the main body 11 of the bumper face 10, as required.

The radiator core 30 is a heat exchanger that cools cooling water in an engine (not illustrated) by performing heat-exchange with the travelling wind. The radiator core 30 has tubes in which cooling water flows and fins are provided around each tube. The radiator core 30 has a panel-like shape on the whole. The radiator core 30 is disposed immediately in front of the engine (not illustrated) so as to face the vehicle front side and stand up substantially vertically.

The condenser 40 is a heat exchanger that cools and condenses a vapor phase coolant in an air conditioning system (not illustrated) by performing heat-exchange with the travelling wind. The condenser 40 has tubes in which a coolant flows and fins are provided around each tube. The radiator core 30 has a panel-like shape on the whole. The condenser 40 is disposed immediately in front of the radiator core 30 and behind the bumper beam 20 and the variable duct 100 so as to face the vehicle front side and stand up substantially vertically.

The radiator panel lower member 50 supports lower ends of the radiator core 30 and condenser 40. The radiator panel lower member 50 is a beam-like member that extends along lower ends of the radiator core 30 and the like in the vehicle width direction. The radiator panel lower member 50 is formed by welding a pair of upper and lower panels made of press-molded steel sheets so that the radiator panel lower member 50a has a hollow closed cross section. An energy absorption (EA) bracket (not illustrated) may be provided between the radiator panel lower member 50 and the air dam 12 of the bumper face 10, as required.

The under cover 60 is a panel-like member that covers a bottom side of an engine compartment (not illustrated). The under cover 60 is made of a resin-based material such as polypropylene (PP). The front end of the under cover 60 is disposed under the radiator panel lower member 50.

The variable duct 100 is disposed behind the opening O defined between the main body 11 of the bumper face 10 and the air dam 12. The variable duct 100 is an adjustable air diffuser that substantially opens and closes an airflow channel that directs the travelling wind from the opening O through the condenser 40 to the radiator core 30. The variable duct 100 improves the aerodynamic characteristics of a vehicle and suppresses fuel consumption by closing the airflow channel in the case of a relatively low cooling load. The variable duct 100 includes a frame 110, louver blades 120, a lower attachment bracket 130, a seal stay 140, an upper attachment bracket (not illustrated), a driver (not illustrated), and the like.

The frame 110 has a laterally elongated rectangular share in the front side of the vehicle. The interior of the frame 110 defines an airflow channel for the travelling wind. The frame 110 has a belt-like upper wall 111 and a belt-like lower wall 112 that extend in the vehicle width direction, and belt-like side walls. The frame 110 is formed by coupling side ends of the upper and lower walls 111 and 112 to each other via the side walls. The upper wall 111 of the frame 110 is fixed on an upper wall 240 of a column 240 described here after by mechanical fastening elements such as tapping screws (not illustrated). The lower wall 112 of the frame 110 is fixed on a frame attachment wall 131 of a lower attachment bracket 130 and on a rear end of the seal stay 140 by mechanical fastening elements such as rivets R.

The louver blades 120 are moved between a closed position where the louver blades 120 are stood substantially vertically to close the interior of the frame 110 substantially and an open position where the louver blades 120 are disposed substantially horizontally not to block the airflow channel of the travelling wind. in the interior of the frame 110 substantially. The louver blades 120 achieve the move by pivoting around a rotary axle extending along the vehicle width direction. In FIG. 1, the louver blades 120 are set to be in a closed position, when the louver blades 120 stand substantially straight. When the louver blades 120 are in the closed position, the louver blades 120 are substantially contained in the interior of the frame 110. When the louver blades 120 pivot, for instance, 90 degrees in the clockwise direction in FIG. 1, the louver blades 120 are set to be in the open position. However, the pivoting angle and direction of the louver blades 120 are not limited to the above actions. In the case of the first example, two louver blades 120 are disposed on the upper and lower sides of the frame 110. The louver blades 120 are moved between the closed position and the open position by a driver (not illustrated) in response to a command signal from a controller (not illustrated). The driver includes, for instance, an actuator such as a motor and a gear train to decrease an output speed of the actuator. The driver is disposed on a side end of the frame 110.

The lower attachment bracket 130 has a frame attachment wall 131, a vertical wall 132, and a vehicle body attachment wall 133. These walls are made and integrated by, for instance, bending a belt-like steel sheet so as to constitute the lower attachment bracket 130. The frame attachment wall 131 is a flat plate and is attached to the lower wall 112 of the frame 110 so as to be disposed substantially horizontally. The frame attachment wall 131 projects backward from the frame 110. The vertical wall 132 projects downward from the rear end of the frame attachment wall 131. The vehicle body attachment wall 133 projects substantially horizontally and backward from the lower end of the vertical wall 132. The rear end of the vehicle body attachment wall 133 is secured to the bottom wall of the radiator panel lower member 50 by a mechanical fastening element such as a resin fastener F.

The seal stay 140 projects forward from the lower wall 112 of the frame 110. A seal material S is provided on the upper front end of the seal stay 140. The seal material S comes into contact with the bottom face of the upper wall of the air dam 12 so as to prevent leakage of the travelling wind. The upper wall of the frame 110 of the variable duct 100 is attached through an upper attachment bracket (not illustrated) to the lower wall of the bumper beam 20.

A column 200 is provided behind the variable duct 100 so as to prevent the variable duct 100 from being broken or dropped due to, for instance, water pressure. The column 200 includes a main body 210, a base 220, a coupling wall 230, an upper wall 240, a curved wall 250, an upper louver axle support wall 260, a lower louver axle support wall 270, and the like. These sections are made and integrated by injection-molding a resin-based material such as polypropylene (PP). Although the column 200 is provided on a central part of the variable duct 100 in the vehicle width direction, the present invention is not limited to this: the positions and number of columns 200 may be altered, as required.

The main body 210 has a column-like shape and extends vertically. The main body 210 is disposed behind the frame 110. The main body 210 is spaced apart from the frame 110 in the front and rear directions so as not to interfere with rotation of the louver blades 120.

The base 220 has a column-like shape and extends upward from the vicinity of the rear end of the lower wall 112 of the frame 110. The lower end of the base 220 is attached to the frame 110 by fixing the lower end of the base 220 on a forward-projecting bracket with the mechanical fastening elements.

The coupling wall 230 couples the lower end of the main body 210 and the upper end of the base 220 to each other. The coupling wall 230 projects forward from the lower end of the main body 210 and slants so that the front end of the coupling wall 230 is positioned lower than that of the rear end of the coupling wall 230.

The upper wall 240 comes into contact with the upper face of the upper wall ill of the frame 110 and is secured to the upper wall 111 by the tapping screw. An aperture is provided in the upper wall 240 in a shape of a so-called hook slot so as to receive the tapping screw. When a backward load to he applied to the upper portion of the frame 110 exceeds a predetermined value, the frame 110 moves backward and falls down from the column 200.

The curved wall 250 interconnects the upper end of the main body 210 and the upper wall 240. As illustrated in FIG. 1, the curved wall 250 has an arcuate shape that bulges upward in the rear side direction of the vehicle.

The upper louver axle support wall 260 has an arm-like shape and projects forward from the lower end of the main body 210. The wall 260 supports an axle of the upper of louver blades 120.

The lower louver axle support wall 270 has an arm-like shape and projects forward from the upper end of the base 220. The wall 270 supports an axle of the lower of louver blades 120.

The column 200 has an upper notch 280 and a lower notch 290. The upper notch 260 is defined by concaving (cutting off) the front edge of the column 200 in a V shape at the connecting portion (the curved portion) between the main body 210 and the coupling wall 230. The lower notch 290 is defined by concaving (cutting off) the rear edge of the column 200 in a V shape at the lower end portion of the base 220.

The upper notch 280 and the lower notch 290 serve as weak portions that become starting points of breakage, when the column 200 is displaced backward and comes into contact with the radiator panel lower member 50 in the case of an accident of the vehicle such as a collision. The breaking strength of the column 200 at the upper notch 280 and the lower notch 290 that serve as starting points is set to be lower than a deforming stress in the vehicle body (the radiator panel lower member 50) and is set to bear pressure caused by splashed water when the vehicle moves through a puddle with the louver blades 120 being in the closed state.

Next, behaviors of the respective members in the attachment structure for the adjustable air diffuser according to the first example of the invention in the case of a slight collision will be described below.

Figure 2:
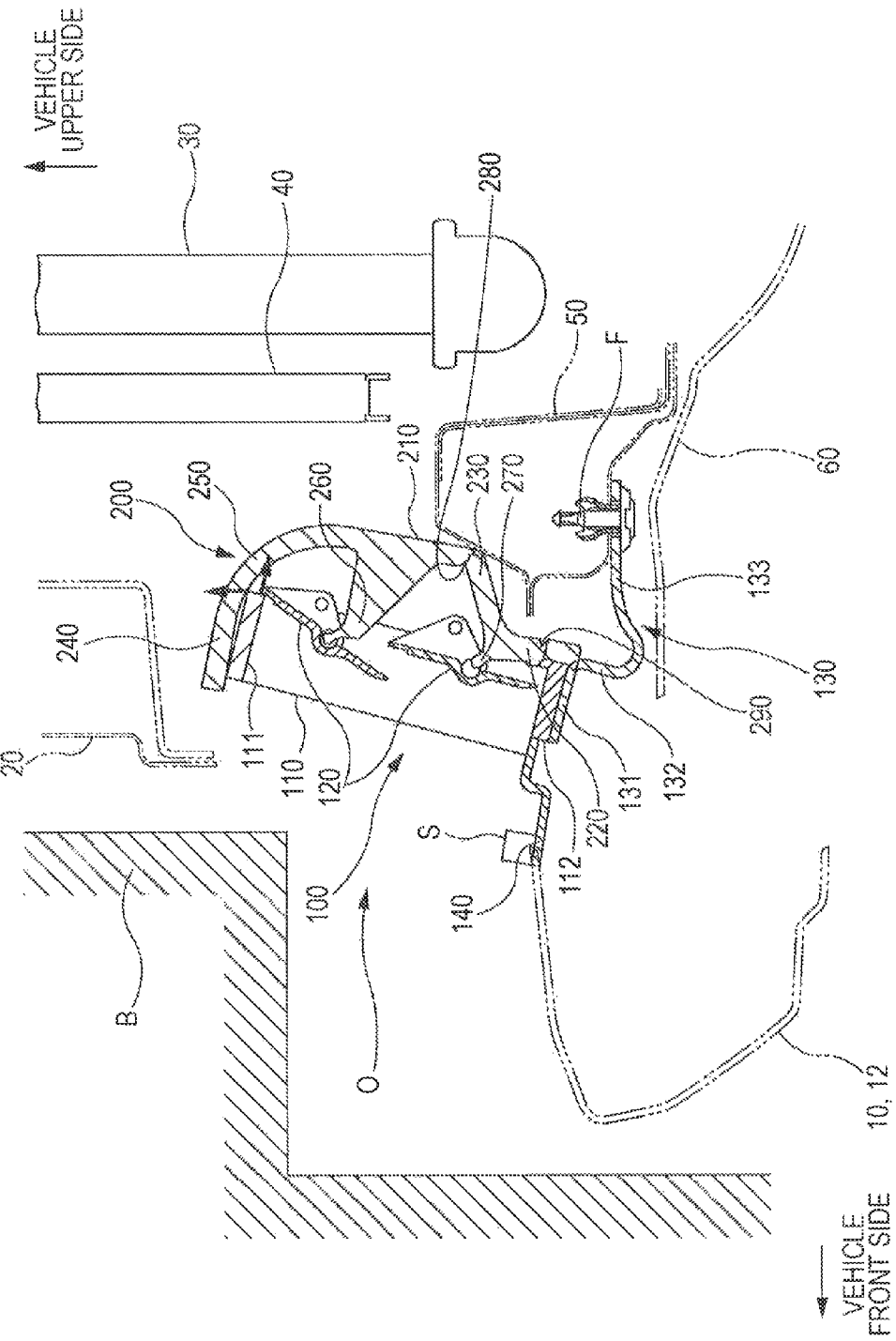
FIG. 2 is a sectional view of a front part of a vehicle including an attachment structure for an adjustable air diffuser according to the first embodiment of the invention, the view being taken in the vehicle direction and illustrating the front cart in a state at the time of a slight collision.

FIG. 2 is a sectional view of the front part of the vehicle including the attachment structure for the adjustable air diffuser according to the first example of the invention, the view being taken in the vehicle direction and illustrating the front part in a state at the time of a slight collision. As illustrated in FIG. 2, when a barrier B that represents a vehicle collides with the vehicle in question at a low speed (for instance, 5 km/h, the bumper beam 20 of the vehicle in question is moved backward while being deformed. At the same time, the upper part of the frame 110 of the variable duct 100 in the vehicle in question moves backward in a diagonal backward direction around the fulcrum of the lower portion of the frame 110. The lower attachment bracket 130 permits the frame 110 to move on account of deformation of the vehicle body attachment wall 133.

At an initial period of moving, the frame 110 and the column 200 move together while they are connected with each other. When the column 200 comes into contact with the radiator panel lower member 50 and the backward load to be applied to the upper part of the frame 110 exceeds the predetermined value, the tapping screw falls down from the hook slot and the upper wall 111 of the frame 110 drops from the upper wall 240 of the column 200. As a result, as illustrated in FIG. 2, the upper wall 111 begins to move backward from the upper wall 240 of the column 200.

The column 200 is disposed so that a corner at which the main body 210 and the coupling wall 230 are connected with each other comes into contact with the front face of the radiator panel lower member 50 at the initial period of moving. The front face slants backward in the direction where the upper end is displaced backward from the lower end. When the column 200 further receives a backward load under a state in which the column 200 comes into contact with the front side of the radiator panel lower member 50, as illustrated in FIG. 2, the upper notch 280 and the lower notch 290 break in sequence.

When the frame 110 is further displaced backward under a state in which the column 200 is broken, a relative sliding displacement occurs between the rear portion (the corner) of the upper wall 111 of the frame 110 and the inner face of the curved wall 250 and thus the inner face of the curved wall 250 slides upward on the corner of the frame 110 on account of the diagonal posture of the inner face. As a result, the main body 210 of the column 200 is displaced backward so as to move upward with respect to the frame 110, thereby preventing the main body 210 from being further pushed on the radiator panel lower member 50.

The first example described above can obtain the following effects:

(1) when the column 200 interferes with the radiator panel lower member 50, the column 200 is broken at the upper notch 280 and the lower notch 290, the column 200 is further pushed on the radiator panel lower member 50. Thus, it is possible to prevent the column 200 from causing any damage to the radiation panel lower 50; and (2) since the upper wall 111 of the frame 110 of the variable duct 100 drops from the upper wall 240 of the column 200 and the upper wall 111 pushes up the slant inner face of the curved wall 250 while sliding on the inner face, the main body 210 of the column 200 after being broken is retracted upward, thereby obtaining the above effects more surely.

Second Example

Next, a second example of the attachment structure for the adjustable air diffuser of the present invention will be described below.

Hereinafter, descriptions in the second example regarding substantially common members between the first and second examples are omitted by assigning the same signs to the common members and different members of the examples will be mainly described in the second example.

Figure 3:
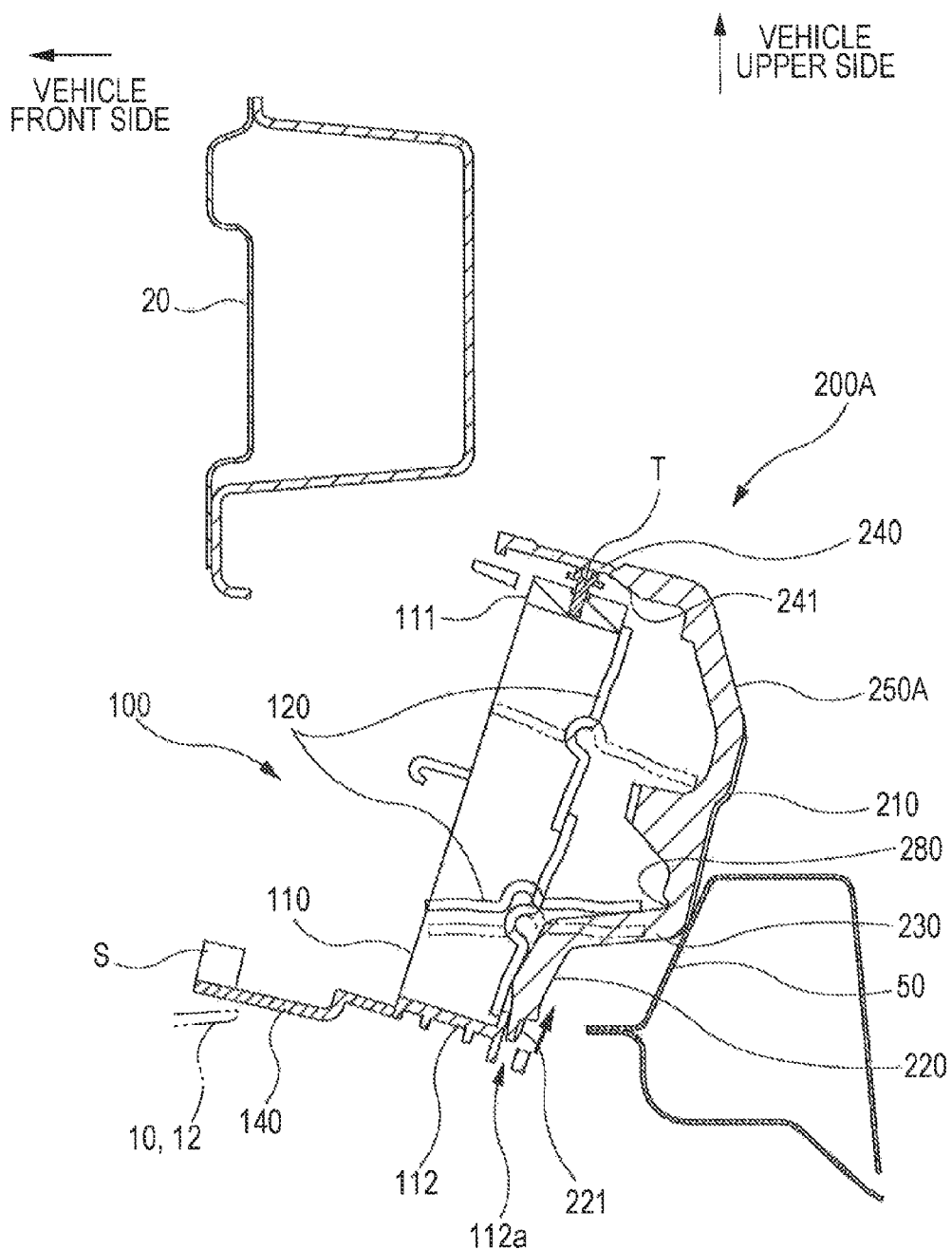
FIG. 3 is a sectional view of a front part of a vehicle including an attachment structure for an adjustable air diffuser according to a second example of the invention, the view being taken in the vehicle direction and illustrating the front part in a state at the time of a slight collision.

FIG. 3 is a sectional view of a front part of a vehicle including an attachment structure for an adjustable air diffuser according to the second example of the invention, the view being taken in the vehicle direction and illustrating the front part in a state at the time of a slight collision.

The attachment structure for the adjustable air diffuser in the second example includes a column 200A mentioned below in lieu of the column 200 in the first example. The column 200A omits the lower notch 290 of the column 200, and a lower end 221 of the base 220 is removably inserted into an opening 112a in the rear end of the lower wall 112 of the frame 110 from the upper side. The column 200A includes a coupling wall 250A in lieu of the curved wall 250 of the column 200 in the first example. The coupling wall 250A is substantially straight and couples the upper end of the main body 210 and the rear end of the upper wall 240 to each other.

A diagonal face 241 is provided on the bottom face of the upper wall 240 in the second example. The diagonal face 241 inclines downward in the rear side direction. The diagonal face 241 slides on a head of a tapping screw T secured to the upper wall 111 of the frame 110 after the frame 110 drops from the upper wall 240. The diagonal face 241 displaces the main body 210 of the column 200A upward in response to retraction of the tapping screw T.

The second example described above can obtain the same effects as those in the first example by drawing the lower end 221 of the base 220 from the lower wall 112 of the frame 110 in lieu of the structure in which the base 220 of the column 200 breaks at the lower notch 290 in the first example.

The invention is not limited to the examples described above. Various modifications and alterations can be performed in the invention and fall into a technical scope of the invention.

Shapes, materials, producing methods, arrangement, and numbers of the adjustable air diffuser, the attachment structure, and the respective members to be attached to the vehicle body are not limited to those of the above examples and can be altered, as required.

For instance, although the upper part of the adjustable air diffuser and the upper part of the column are coupled to each other by using the hook-like slot and the tapping screw in the examples, the invention is not limited to this structure. The upper parts of them may be connected with each other by another structure so long as the upper part of the adjustable air diffuser can drop from the column by a backward load over the predetermined value. For instance, it is possible to adopt an engagement mechanism unit in which engagement is released by a load over the predetermined value or to adopt a weak portion to be broken by a load over the predetermined value.

Although the lower part of the variable duct is attached to the radiator panel lower member in the above examples, the invention is not limited this structure. For instance, the lower part of the variable duct may be attached to an energy absorption bracket that projects forward from the radiator panel lower member or may be attached through another element to a vehicle structure member.

The invention claimed is:

1. An attachment structure for an adjustable air diffuser disposed in an airflow channel into which a travelling wind is directed through an opening provided in a bumper face, the adjustable air diffuser being configured to substantially open and close the airflow channel by a movable louver blade to be driven by an actuator, wherein:

an upper part of the adjustable air diffuser is disposed to face a rear wall of the bumper face and is attached to a bumper beam extending substantially along a vehicle width direction;

a lower part of the adjustable air diffuser is attached to a vehicle body structural member;

the attachment structure includes a column disposed behind the adjustable air diffuser, a lower end of the column being attached to a lower end of the adjustable air diffuser;

the column includes a vertically extending main body disposed behind a frame of the adjustable air diffuser so as not to interfere with rotation of the movable louver blade, a coupling wall that couples a lower end of the main body and the lower end of the adjustable air diffuser, and a louver axle support wall that projects forward from the main body so as to support an axle of the movable louver blade; and at least one weak portion is provided on the column such that the column breaks when the column interferes with another member behind the column.

2. The attachment structure for the adjustable air diffuser according to claim 1, wherein two weak portions are provided in the column at the vicinity of an intermediate position and a lower end position in a height direction of the column.

3. The attachment structure for the adjustable air diffuser according to claim 2, wherein:

an upper end of the column is attached to an upper end of the adjustable air diffuser such that the upper end of the adjustable air diffuser is detachable from the column when the upper end of the adjustable air diffuser receives a backward load over a predetermined value; and the column is provided with a diagonal face that is pushed to move upward in response to relative retraction movement of the upper end of the adjustable air diffuser after the adjustable air diffuser has been detached from the column.

4. The attachment structure for the adjustable air diffuser according to claim 1, wherein:

an upper end of the column is attached to an upper end of the adjustable air diffuser such that the upper end of the adjustable air diffuser is detachable from the column when the upper end of the adjustable air diffuser receives a backward load over a predetermined value; and the column is provided with a diagonal face that is pushed to move upward in response to relative retraction movement of the upper end of the adjustable air diffuser after the adjustable air diffuser has been detached from the column.

5. An attachment structure for an adjustable air diffuser disposed in an airflow channel into which a travelling wind is directed through an opening provided in a bumper face, the adjustable air diffuser being configured to substantially open and close the airflow channel by a movable louver blade to be driven by an actuator, wherein:

an upper part of the adjustable air diffuser is disposed to face a rear wall of the bumper face and is attached to a bumper beam extending substantially along a vehicle width direction;

a lower part of the adjustable air diffuser is attached to a vehicle body structural member;

the attachment structure includes a column that is disposed behind the adjustable air diffuser, a lower end of the column being attached to a lower end of the adjustable air diffuser;

the column includes a vertically extending main body disposed behind a frame of the adjustable air diffuser so as not to interfere with rotation of the movable louver blade, a coupling wall that couples a lower end of the main body and the lower end of the adjustable air diffuser, and a louver axle support wall that projects forward from the main body so as to support an axle of the movable louver blade; and the column is configured to drop from the adjustable air diffuser by another member behind the column when the column interferes with the another member.

6. The attachment structure for the adjustable air diffuser according to claim 5, wherein:

an upper end of the column is attached to an upper end of the adjustable air diffuser such that the upper end of the adjustable air diffuser is detachable from the column when the upper end of the adjustable air diffuser receives a backward load over a predetermined value; and the column is provided with a diagonal face that is pushed to move upward in response to relative retraction movement of the upper end of the adjustable air diffuser after the adjustable air diffuser has been detached from the column.

\* \* \* \* \*